UNITED STATES PATENT OFFICE.

RICHARD HUNT AND EDGAR SIDDONS WILSON, OF LIVERPOOL, COUNTY OF LANCASTER, ENGLAND.

PROCESS OF EXTRACTING OIL FROM COTTON-SEED.

SPECIFICATION forming part of Letters Patent No. 369,857, dated September 13, 1887.

Application filed May 11, 1887. Serial No. 237,841. (No specimens.) Patented in England January 24, 1887, No. 1,057.

*To all whom it may concern:*

Be it known that we, RICHARD HUNT and EDGAR SIDDONS WILSON, subjects of the Queen of Great Britain, residing at Liverpool, in the county of Lancaster, England, have invented a certain new and useful Improvement in the Treatment of Cotton-Seed to Obtain Oil, Feeding-Cake, and Resin-Like Matter, (for which we have applied for British Letters Patent, No. 1,057, dated January 24, 1887, and nowhere else;) and we do hereby declare that the following is a full, clear, and exact description of the invention, which will enable others skilled in the art to which it appertains to make and use the same.

We have found that the kernels of cotton-seed contain considerable numbers of globules or corpuscles of resin-like matter in a more or less liquid condition. We have further discovered that in consequence of the admixture of the said globules or corpuscles with the kernels during pressing the resulting oil and cake, and particularly the former, are of a dark and undesirable color.

Now, the object of our invention is to separate the said globules or corpuscles from the kernels and to obtain oil and feeding-cake of superior quality.

Under our invention we heat cotton-seed until the volatile matter contained in the globules or corpuscles is driven off and the said globules or corpuscles become solidified. The heating is effected in any suitable apparatus employed for like purposes. We find that the said volatile matter is effectually driven off by raising the said seed to a temperature between 200° and 300° Fahrenheit for from fifteen to twenty-five minutes. Care must be taken not to raise the temperature so high nor to submit the seeds to the action of heat a sufficient length of time to char or injure the kernels. After the seed has beeen heated as above set forth it is decorticated in any usual manner, and the kernels are disintegrated or broken into coarse flour or fine meal between stones or rollers or in a disintegrator or other appliance—such as is used for the reduction of wheat or maize into meal and flour. The cotton-seed meal or flour is now subjected to the action of air-currents, or is treated in centrifugal or gravity separators or purifiers, so as to separate the solidified globules or corpuscles from the rest of the kernel, as the globules or corpuscles are of greater specific gravity than the meal. The apparatus used must be such as is capable of separating bodies of different specific gravities from each other. Those used in starch and flour making are suitable.

The meal or flour free from the globules or corpuscles is pressed and the oil extracted in the usual manner. The oil will be found to be clear, pure, and sweet, and the cake will be of superior quality and color to that heretofore made. The resin-like globules or corpuscles are collected and utilized in any convenient manner.

We claim—

1. In the process of extracting cotton-seed oil, the improvement which consists in heating the seed to expel volatile matters and solidify the resin globules and separating the resin globules from the meal, substantially as and for the purposes described.

2. In the process of extracting cotton-seed oil, the improvement which consists in expelling volatile matters and solidifying the resin globules by means of heat, grinding the seeds, separating the resin globules from the meal, and extracting the oil from the meal, substantially as and for the purposes described.

3. Subjecting cotton-seed to the action of heat, decorticating the heated seeds, reducing the decorticated seeds into meal or flour, and separating from the meal or flour resin-like matter, substantially as set forth.

RICHARD HUNT.
EDGAR SIDDONS WILSON.

Witnesses:
JAMES JOHNSON,
W. B. JOHNSON.